Patented May 14, 1929.

1,712,930

UNITED STATES PATENT OFFICE.

JACQUE C. MORRELL, OF OAK PARK, ILLINOIS.

METHOD OF ACTIVATING CARBON.

No Drawing.   Application filed March 4, 1926. Serial No. 92,337.

This application is a continuation-in-part of my application, Ser. No. 640,229, filed May 19, 1923.

Carbon and adsorbent charcoals of various kinds have heretofore been treated with various oxidizing agents, such as air, steam, $CO_2$, chlorine gas, etc., at high temperatures in order to increase their efficiency and adsorptive powers.

In my U. S. Patent No. 1,478,985, activation of charcoal or carbon has been defined as an increase in the adsorption efficiency of the materials, and the following are some of the methods which are given for accomplishing this result:

(a) Repeated heat treatments.
(b) Steam treatment.
(c) Heating in the presence of mild oxidizing agents.

It is also stated in this patent that the process of activation is probably:

(a) An opening up of the closed pores into ducts (continuous pores) by fracturing the walls.
(b) Removal of tenaceous hydrocarbons and compounds other than carbon by decomposition, cracking and volatilization.
(c) Changing hard graphitoidal or "coke like carbon" (which is essentially inactive carbon), to the soft, dull, velvety or non-graphitoidal variety.
(d) Removal of secondary carbon obstructions from the ducts.
(e) Forming or creating new ducts in the carbon, and thus increasing adsorption surface.

As a means of activation, I employ a mild oxidizing agent, and the purpose of such treatment of the carbon or charcoal with a mild oxidizing agent is to bring about the aforementioned results without objectionable destruction of the charcoal particle. The term "mild oxidizing agent" is restricted only in this sense.

The object of this invention is to accomplish one or more of these results with the ultimate design of increasing the adsorption efficiency of the treated charcoal or carbon; that is, the activation of the finished product or the raw material used for making artificial or synthetic charcoal or for other purposes disclosed in the said patent. The treatment of raw carbonaceous material of a coke or graphitoidal nature by my new process converts it into the dull, velvety, black variety.

In the process disclosed in the aforesaid application, Ser. No. 640,229, I employ aqueous solutions of the halogens; particularly aqueous solutions of chlorine. The reaction of such a system may be represented by the following equation:

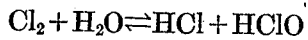
$$Cl_2 + H_2O \rightleftharpoons HCl + HClO$$

The HClO (hypochlorous acid) which is formed in this reaction is a very good oxidizing agent and decomposes with considerable energy, thereby assisting the activation.

This reaction is, however, reversible, and the hydrochloric acid will react, at least in part, with the HClO to give the original starting materials, namely water and chlorine. I have found by removing some or all of the hydrochloric acid generated in the reaction before it can react with the HClO to regenerate chlorine and water, that I obtain a marked increase in efficiency of the charcoal activation, since the HClO is apparently the active agent in the activation of charcoal in such a system.

I have also found that in removing the HCl from the sphere of reaction that it is necessary to avoid the use of materials which will react with the HClO so as to destroy its power of activation of the charcoal. In order to accomplish this result, I use a neutralizing material which selectively reacts with the hydrochloric acid and not with the hypochlorous acid (HClO), which remains practically unaffected. Examples of these neutralizing materials are the carbonates which include the normal carbonates and bicarbonates of the alkali metals and alkaline earth metals such as sodium, potassium, calcium, magnesium, etc. These are the most common and readily available materials, but other carbonates and bicarbonates may be used advantageously under certain conditions, for example ammonium carbonate or bicarbonate. The ammonium radical is herein regarded as a metal.

The true alkalies or soluble hydroxides of metals do not appear suitable for the process of this invention since they react with the hypochlorous acid as well as with the hydrochloric acid to form the corresponding salts and the charcoal will not be given the activation accomplished with hypochlorous acid.

In practicing my new method for activation of carbon or charcoal the solution of halogen in water, for example chlorine in water, may be passed thru a column of limestone or marble before treating the charcoal. Also, the limestone, marble or other form of calcium carbonate may be powdered and placed in the aqueous solution of chlorine; or the chlorine passed thru an aqueous suspension of the calcium carbonate before use. If the powdered limestone, marble, or other form of calcium carbonate has a tendency to settle, it can be kept in suspension by a suitable stirring means. The same applies to the use of the other carbonates and bicarbonates, for example the carbonates or bicarbonates of sodium or potassium, which may be dissolved in water and chlorine passed therethrough, or else the carbonates and bicarbonates added to the solution of chlorine or other halogen in water.

I prefer to have the unactivated or partially activated carbon material in a finely divided condition or in a granular state while it is undergoing activation, as this promotes the activating reactions.

A specific example of carrying out my invention is as follows: The carbon or charcoal in a finely divided or granular state is introduced into a concentrated solution of chlorine, preferably a saturated aqueous solution, in which has been dissolved or suspended a carbonate or bicarbonate of a metal. The strength of the chlorine in the solution is maintained by introducing the chlorine from time to time until absorption is complete. The mass may be allowed to stand until the desired reaction and activation have occurred. It is often desirable to have the charcoal at a slightly elevated temperature when being introduced into the solution, and the charcoal may be taken direct from the furnace and brought into immediate contact with the solution of chlorine i. e. hypochlorous acid, and containing the carbonate or bicarbonate. A better means of accomplishing this is to place the charcoal into the solution and heat for the desired period.

The charcoal may be allowed to stand in the presence of the solution containing hypochlorous acid while heating or the latter may be circulated thru a body of the charcoal. In either method of treatment, the reagent may be strengthened and replenished from such time to time as found necessary.

My present process of activation may be employed to supplement or assist the activation by heat treatments, and may precede or follow such heat-treatment activation. If it is desired to use my new activation process in connection with steam activation, the carbon or charcoal after activation by the solution containing hypochlorous acid is dried and then steam activated for example according to the process described in my aforesaid patent.

Other features not mentioned herein but disclosed in my aforesaid patent and other patents issued to me on charcoal activation may be used in connection with my present new process. Furthermore, it is to be understood that the process disclosed herein may be applied to the activation of gas adsorbing and decolorizing charcoals as described in my said patents.

In practicing my invention, other halogens, for example bromine, may be employed in place of chlorine, but I prefer to use the latter for economic reasons and because it operates very satisfactorily. A mixture of halogens may also be employed instead of a single halogen, and I have found that in some cases the addition of a small amount of bromine to the chlorine solution helps to start the reaction.

Instead of preparing a solution of a halogen from the elemental halogen and solvent therefor, I may employ the halogen electrolytically generated in situ for my activation, in which case the necessary modifications and adaptations are made similar to those set forth in my aforesaid application.

By my new process not only is a marked increase in the efficiency of activation accomplished, but there is also a reduction in equipment corrosion by hydrochloric acid.

In the following claims, wherever the expression "alkali-forming metal" is used, it is intended to cover the base-forming elements of the alkali metal and alkaline earth metal groups and also ammonium. By the term "carbon", as employed in the claims, is meant pure carbon or a mixture of natural or artificial origin which contains a high percentage of carbon. This includes the various charcoals and carbons of animal, vegetable or mineral origin.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of activating carbon, treating the carbon with a solution of a halogen in water and neutralizing any halide of hydrogen in the aqueous solution by means of a neutralizing substance which selectively reacts with hydrochloric acid and not with hypochlorous acid.

2. In a process of activating carbon, treating granules of carbon with a solution of chlorine in water and neutralizing any hydrochloric acid in the aqueous solution by means of a neutralizing substance which selectively reacts with hydrochloric acid and not with hypochlorous acid.

3. In a process of activating carbon, treating the carbon with a solution of a hypohalogenous acid in water, said solution being substantially free of halides of hydrogen.

4. In a process of activating carbon, treating the carbon with a solution of chlorine in water, said solution being substantially free of hydrochloric acid.

5. In a process of activating carbon, treating the carbon with a solution of chlorine in water, and preventing reversible reaction between the hydrochloric acid and hypochlorous acid resulting from the solution of chlorine in water by adding a neutralizing substance which selectively reacts with the hydrochloric acid and not substantially with the hypochlorous acid.

6. In a process of activating carbon, treating the carbon with a solution of a halogen in water carrying a dispersion of a carbonate of an alkali-forming metal.

7. In a process of activating carbon, treating particles of carbon with a solution of a halogen in water carrying a solution of a carbonate of an alkali-forming metal.

8. In a process of activating carbon, treating the carbon with a solution of a halogen in water carrying a dispersion of a bicarbonate of an alkali-forming metal.

9. In a process of activating carbon, treating the carbon with a solution of a halogen in water carrying a solution of a bicarbonate of an alkali-forming metal.

10. In a process of activating carbon, treating granules of carbon with a solution of hypochlorous acid in water carrying a dispersion of a carbonate of an alkali-forming metal.

11. In a process of activating carbon, treating particles of carbon with a solution of chlorine in water carrying a solution of a carbonate of an alkali-forming metal.

12. In a process of activating carbon, treating the carbon with a solution of chlorine in water carrying a dispersion of a bicarbonate of an alkali-forming metal.

13. In a process of activating carbon, treating the carbon with a solution of chlorine in water carrying a solution of a bicarbonate of an alkali-forming metal.

14. In a process of activating carbon, treating the carbon with a solution of a halogen in water carrying a dispersion of a carbonate of an alkali metal.

15. In a process of activating carbon, treating the carbon with a solution of a halogen in water carrying a dispersion of a bicarbonate of an alkali metal.

16. In a process of activating carbon, treating the carbon with a solution of a hypohalogenous acid in water carrying a dispersion of a carbonate of an alkali-forming metal in excess of that necessary for neutralizing any halide of hydrogen present in said aqueous solution.

17. In a process of activating carbon, treating the carbon with a solution of a halogen in water carrying a dispersion of a carbonate of an alkali metal in excess of that necessary for neutralizing any halide of hydrogen present in said aqueous solution.

In testimony whereof I affix my signature.

JACQUE C. MORRELL.